United States Patent [19]

Dighton

[11] Patent Number: 4,775,580

[45] Date of Patent: Oct. 4, 1988

[54] POROUS RANDOM FIBER COMPOSITES AND A METHOD FOR PREPARING SAME

[75] Inventor: Gaylon L. Dighton, Baton Rouge, La.

[73] Assignee: The Dow Chemical Company, Midland, Mich.

[21] Appl. No.: 46,951

[22] Filed: May 5, 1987

Related U.S. Application Data

[63] Continuation-in-part of Ser. No. 709,482, Mar. 8, 1986, abandoned.

[51] Int. Cl.$^4$ .................. B32B 17/04; B32B 5/16; D04H 1/60

[52] U.S. Cl. .................................. 428/284; 162/101; 162/123; 162/145; 162/169; 162/177; 162/206; 264/49; 264/109; 264/122; 428/296; 428/316.6; 521/61; 524/43; 524/46

[58] Field of Search .................. 264/49, 109, 122; 521/61; 428/284, 296, 316.6; 524/43, 46; 162/101, 123, 145, 169, 177, 206

[56] References Cited

U.S. PATENT DOCUMENTS

| | | | |
|---|---|---|---|
| 2,773,286 | 12/1956 | Piccard et al. | 18/48 |
| 2,831,852 | 4/1958 | Savage . | |
| 2,835,666 | 5/1958 | Savage . | |
| 3,121,658 | 2/1964 | Orsino et al. | 162/146 |
| 3,297,583 | 1/1967 | Dierichs | 252/363.5 |
| 3,578,544 | 5/1971 | Thorsrud . | |
| 3,865,661 | 2/1975 | Hata et al. | 156/79 |
| 3,957,651 | 5/1976 | Kesting | 210/490 |
| 4,100,238 | 7/1978 | Shinomura | 264/49 |
| 4,426,470 | 1/1984 | Wessling et al. | 524/35 |
| 4,431,696 | 2/1984 | Di Drusco et al. | 428/212 |
| 4,518,642 | 5/1985 | Johnston et al. | 264/126 X |
| 4,643,940 | 2/1987 | Shaw et al. | 428/308.4 |

FOREIGN PATENT DOCUMENTS 2507123 10/1982 France .
1263812 2/1972 United Kingdom .

*Primary Examiner*—Philip Anderson
*Attorney, Agent, or Firm*—D. R. Howard; D. L. Corneglio

[57] ABSTRACT

A process for preparing a porous random fiber polymeric composite sheet through the addition of a cellulose ether which is selectively soluble or insoluble to a random fiber composite slurry under conditions such that the cellulose ether is insoluble, forming the slurry into a sheet, fusing the organic polymer component of the sheet and heating the sheet to solubilize the cellulose ether whereby voids are formed in the sheet. Before the sheet is treated to remove the cellulose ether, it may be combined with other sheets and densified under heat and pressure. Before removing the cellulose ether, the densified sheet may be heated under reduced pressure to expand or loft the sheet in a direciton normal to the plane of the sheet. A random fiber polymeric composite sheet, a densified sheet and a lofted sheet, each comprising a binder, fusable organic polymer, reinforcing material and a cellulose ether are also provided. The same sheets after removal of the cellulose ether are further provided.

21 Claims, 2 Drawing Sheets

EXPANDED POROUS
COMPOSITE PROCESS

NONEXPANDED POROUS COMPOSITE PROCESS

POROUS RANDOM FIBER COMPOSITES AND A METHOD FOR PREPARING SAME

CROSS-REFERENCE TO A RELATED APPLICATION

This is a continuation-in-part of our prior, copending application, Ser. No. 709,482, filed Mar. 8, 1986 now abandoned.

BACKGROUND OF THE INVENTION

This invention is directed toward a porous random fiber composite sheet and process for preparing a porous random fiber composite sheet. The process employs a water-soluble cellulose ether in the preparation of the composite sheet which is subsequently dissolved out of the sheet with cold water. The sheet so formed has voids wherever the cellulose ether was present.

The preparation of a random fiber composite sheet is described in U.S. Pat. No. 4,426,470 to Wessling et al. The random fiber composite sheet, also referred to as a reinforced polymer composite or polymeric composites, generally employs wet-laid aqueous techniques such as disclosed in U.S. Pat. Nos. 4,426,470 and 4,431,696. Additionally, foreign patents disclose the wet-laid aqueous procedures to produce polymeric composites. Such patents include U.K. patent No. 1,263,812; French Patent Publication No. 2,507,123 and European Patent Office Publication No. 0,039,292-Al.

While the foregoing procedures can be employed to form solid continuous sheets of reinforced polymer, it would be desirable to be able to form a sheet which is permeable or porous. Such sheets could be advantageously employed as filter media, baffles, battery separators or in other applications where a high strength reinforced porous sheet is desired. Additionally, by adjusting the polymeric content of the sheet various physical properties could be achieved from a stiff porous sheet to a flexible porous sheet.

SUMMARY OF THE INVENTION

The present invention provides for a process for preparing a porous random fiber polymeric composite sheet comprising the addition of a soluble cellulose ether to a random fiber composite slurry comprising a diluent, a fusible organic polymer, reinforcement material and binder under conditions such that said cellulose ether is insoluble; forming said slurry into a sheet; and treating said sheet under conditions sufficient to solubilize said cellulose ether whereby voids are formed in said sheet. Where the random fiber composite slurry is an aqueous slurry the conditions for maintaining the cellulose ether insoluble are to maintain the temperature of said aqueous slurry above the gelation point of the cellulose ether. Nonaqueous diluents can be employed to prepare the random fiber composite slurry such as lower aliphatic alcohols or perchloroethylene. Typical cellulose ethers include methylcellulose and hydroxyalkyl methylcellulose where the alkyl consists of lower aliphatic groups containing from about one to about six carbon atoms. Illustrative lower aliphatic groups include methyl, propyl and butyl moieties. Preferred cellulose ethers are methylcellulose and hydroxypropyl methylcellulose. Other soluble cellulose ethers are surface treated cellulose ethers which, by pH variation, can be rendered insoluble in the aqueous slurry in which they are initially dispersed or soluble in an aqueous medium used to solubilize the ether after the slurry is formed into a sheet.

The present invention also provides a process for preparing an expanded, porous random fiber polymeric composite sheet. The process comprises (a) preparing a random fiber composite slurry comprising a diluent, a fusible organic polymer, at least one reinforcing material, a binder and a cellulose ether, which is selectively soluble or insoluble, under conditions such that said cellulose ether is insoluble; (b) destabilizing and forming said slurry into a mat or sheet; (c) dewatering and drying said mat; (d) fusing a plurality of mats into a densified sheet; (e) heating said densified sheet under conditions sufficient to soften the fusible polymer and expand said sheet in a direction normal to the plane of the sheet thereby forming a lofted sheet; and (f) treating said lofted sheet under conditions sufficient to solubilize said cellulose ether and form voids in said lofted sheet.

The present invention further provides a random fiber polymeric composite sheet or mat comprising a binder, a fusible organic polymer, a reinforcing material, and a cellulose ether. The mat can be used as is. It can also be combined with at least one other mat and fused, by application of heat and pressure, into a densified sheet. The densified sheet can, in turn, be heated with little or no pressure to expand the sheet in a direction normal to the plane of the sheet thereby forming a lofted sheet. The mat, the densified sheet and the lofted sheet can all be treated to remove the cellulose ether therefrom to form voids in place of the cellulose ether. Accordingly, the present invention still further provides random fiber polymeric composite mats, densified sheets and lofted sheets having at least some porosity due to voids disposed therein.

Skilled artisans will recognize that cellulose ethers are removed from the lofted sheet far more readily than from the densified sheet and that total removal thereof from the densified sheet may not be practical or even possible.

A variety of articles of manufacture having a desired porosity are readily prepared by removing the cellulose ether after the articles are prepared.

DETAILED DESCRIPTION OF THE INVENTION

Figure 1:
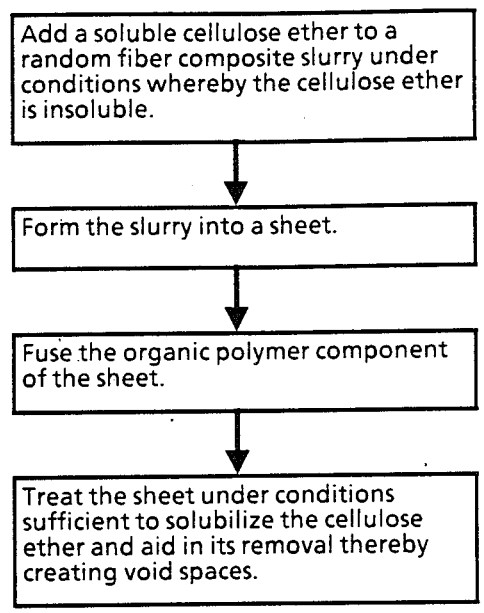
FIG. 1 is a schematic representation of a process for preparing a nonexpanded porous random fiber polymeric composite sheet.
Figure 2:
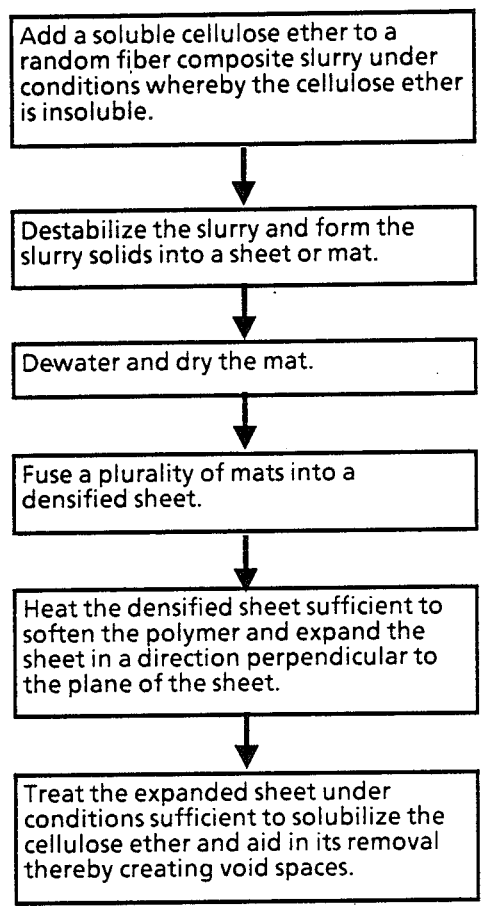
FIG. 2 is a schematic representation of a process for preparing an expanded porous random fiber polymeric composite sheet.

The process for preparing a porous reinforced polymeric mat or sheet is generally similar to the wet-laid processes employed for preparing conventional reinforced polymeric sheets with modifications to allow for the incorporation of various amounts of a water-soluble cellulose ether. Typically, in an aqueous system the slurry is maintained at a temperature higher than the gelation point of the particular cellulose ether employed so the cellulose ether can be incorporated into the collected and finished sheet.

Where a nonaqueous diluent is employed to prepare the slurry no further precautions are generally necessary to prevent the cellulose ether from solubilizing. Nonaqueous diluents can include aliphatic alcohols or perchloroethylene. In the case of some lower aliphatic alcohols, such as methanol, preparation and handling of the slurry would have to be done in a pressurized system because of the low boiling point of the alcohol and the solubility of the cellulose ether in said alcohol.

Another method for maintaining the cellulose ether in an insoluble state while preparing the sheet involves use of a surface treated cellulose ether which is solubilized simply by adjusting the pH. In other words, the cellulose ether could be incorporated into the sheet at one pH and dissolved out of the sheet by treating the sheet at another pH. Surface treatment allows use of cellulose ethers which are normally non-gelling in the processes described herein. Surface treated cellulose ethers are disclosed in U.S. Pat. No. 3,297,583, herein incorporated by reference.

The cellulose ether compound required for the subject process is generally known in the art to exhibit varying solubility characteristics according to the degree to which the cellulose has been etherified. The term "cellulose ethers" as used herein is meant to include basic cellulose ethers which are capable of being rendered insoluble by controlling the temperature of the water environment above the gelation point of the respective cellulose ether, as well as surface treated cellulose ethers which are selectively soluble or insoluble depending upon the pH.

Generally, the cellulose ethers are described as alkyl ethers of cellulose and hydroxyalkyl ethers of cellulose where the alkyls are lower aliphatic groups, o i.e., methyl, propyl and butyl. Preferably, the cellulose ethers are hydroxypropyl methylcellulose, hydroxybutyl methylcellulose or methylcellulose. The preferred watersoluble cellulose ethers are methylcellulose and hydroxypropyl methylcellulose.

Examples of the preparation of water-soluble cellulose ethers are disclosed in U.S. Pat. Nos. 2,831,852 and 2,835,666.

The more preferred cellulose ethers are methylcellulose ethers or hydroxypropyl methylcellulose ethers having a degree of substitution between about 1.1 and about 2.0 and having a molar substitution of from about 0 to about 1.0. "Degree of substitution" is defined as the average number of methyl groups per anhydroglucose unit in the cellulose molecule. "Molar substitution" is defined as the average number of moles of hydroxy alkyl per anhydroglucose unit in the cellulose molecule.

A second consideration in choosing a cellulose ether is its two percent solution viscosity. The lower this viscosity the more easily the cellulose ether can be removed from the polymeric sheet. The preferred range of two percent solution viscosity would be from about 10 to 60 cps for ease of removal; however, ranges from 4 to about 100,000 cps are operable.

In preparing a porous random fiber composite, a dilute slurry is prepared comprising the cellulose ether, a fusible organic polymer, reinforcement material and a binder. The dilute slurry is typically an aqueous slurry. It may, however, be a nonaqueous slurry prepared with lower aliphatic alcohols or perchloroethylene as the diluent. The term "lower aliphatic alcohols" is used herein to designate those alcohols containing from about one to about six carbon atoms. Certain of the cellulose ethers, e.g. methylcellulose have substantial solubility in certain of these alcohols, e.g., methanol. Methanol, for example, also has a boiling point which is below the temperature at which the cellulose ether forms a gel. In using methanol or another low boiling alcohol as the diluent, the slurry must be maintained under sufficient pressure to maintain the alcohol as a liquid and to prevent it from boiling below the gel temperature of the cellulose ether.

Generally, the wet-laid process for preparing the polymeric sheet is conveniently and preferably carried out by first stirring the reinforcing material in the diluent until a uniform dispersion is obtained. The diluent is desirably water or thickened water. The binder material is then slowly added, followed by the gradual addition of the heat fusible polymer. All additions are made with stirring in order to form a uniform dispersion. Once all ingredients are uniformly dispersed, the cellulose ether is added and uniformly dispersed. The dispersion is then destabilized thereby causing solid components of the dispersion to agglomerate so they can be collected and formed into a wet mat. The wet mat is then dewatered and dried.

The sheet forming and dewatering steps can be accomplished on conventional wet-laid aqueous apparatus such as paper making machines, Fourdrinier machine, sheet mold, etc.

The wet mat is suitably dried in a heated oven wherein the polymer component is fused. Optionally, the wet mat can be dried and the polymer component thereof fused by passing the wet mat through a series of heated drier rolls. The dried mat can then be rolled into a cylinder or collected as a flat sheet. A more detailed description of the preparation of polymeric composite sheets containing no cellulose ether is made in U.S. Pat. No. 4,426,470, the teachings of which are incorporated herein by reference.

After the sheet or mat has been formed, it can be further densified by pressing it with a flat press or by sending it through calendering rolls. Densification after drying of the composite is particularly useful for increasing the tensile and tear strength of the composites. Two or more of such mats or sheets are suitably fused into a densified sheet by application of sufficient heat and pressure. The number of mats needed to form the densified sheet is dictated by the desired thickness thereof. The pressure is suitably applied after the heat fusible polymer portion of the mats has softened in order to minimize, if not eliminate, breaking of the reinforcing fibers.

After the composite has been fused, it can then be treated to solubilize and thereby remove the imbedded cellulose ether. Generally, this treatment can be accomplished by spraying the composite with, or submerging the composite in, cold water, i.e., water below the gelation point of the respective cellulose ether. Where a surface treated cellulose ether is employed, the treatment can be accomplished by spraying the composite with, or submerging the composite in, an appropriately pH adjusted media. After the cellulose ether has dissolved the composite is removed from its treatment medium to yield a random fiber-reinforced polymeric sheet having pores or voids where the cellulose ether once was present.

The densified composite sheet and the lofted composite sheet can be treated in the same manner. Complete removal of the cellulose ether from the densified composite sheet is not, however, practical even with extended treatment time.

The densified composite sheet is preferably heated to expand the composite in a direction normal to the plane of the sheet and reduce the density of said composite sheet before the cellulose ether is removed. The expansion of the sheet is defined herein as lofting. Lofting prior to removal of the cellulose ether produces a sheet having a low density and a high degree of porosity. Lofting is more fully discussed in U.S. Pat. No. 4,643,940, the teachings of which are incorporated herein by reference.

By adjusting the level of cellulose ether employed in the preparation of the composite varying degrees of porosity can be obtained. The cellulose ether is generally added to the composite slurry as a ground particle or powder. The physical form and size of the cellulose ether can be selected to provide the type and degree of porosity desired.

In the foregoing process the major components, other than the cellulose ether, which are employed in the slurry and which ultimately form the sheet, are generally described as the binder, a fusible organic polymer, reinforcement material and, where necessary, a flocculant. The binder is added to the slurry to aid in binding or adhering the suspended components such that they can be destabilized and collected.

Typical binders are starch, synthetic polymers and natural polymers. One such binder is a latex comprising an aqueous colloidal dispersion of substantially water-insoluble organic polymers having anionic or cationic bound charges in an amount sufficient to provide stabilization of the colloid, but insufficient to cause the polymer to be water-soluble. Further disclosure as to the binder is found in U.S. Pat. No. 4,426,470.

The fusible organic polymers which can be employed in the subject invention are those polymer particles which are capable of deformation under heat or pressure or both to join into a unitary structure. These fusible polymers can be either thermoplastic or thermoset resins. The fusible organic polymer component is desirably a hydrophobic, water-insoluble polymer. These polymers may be in the form of either powders or dispersions. Suitable fusible organic polymers are polyethylene, chlorinated polyethylene, polycarbonates, nylon, styrene homopolymers and copolymers. Other suitable fusible organic polymers are disclosed in U.S. Pat. No. 4,426,470, herein incorporated by reference. The polymers are generally employed in an amount of from about 19 to about 79 percent by weight of the solids, dry weight basis.

The reinforcement materials include both organic and inorganic products such as glass, graphite, metal fibers or metal coated glass or graphite fibers, aromatic polyamides, cellulose and polyolefin fibers. Preferably glass fibers are employed such as chopped glass having a length of about ⅛ to 1 inch (about 3.2 to 25.4 mm) and/or milled glass fibers having a length of about 1/32 A to ⅛ inch (about 0.79 to 32 mm). Other reinforcement materials are disclosed in U.S. Pat. No. 4,426,470, the teachings of which are incorporated herein by reference. The reinforcement material generally comprises from about o 10 to about 80 weight percent of the solids, dry weight basis.

The slurry of the present invention is destabilized in order that the components can be collected. Typically, the binder bears a charge and a polymeric flocculant having a charge opposite that of the binder is employed to destabilize or flocculate solid components of the slurry. Other means of destabilizing the slurry can, however, be employed provided such means are suitable for use in conjunction with the binder. Examples of suitable flocculants include partially hydrolyzed polyacrylamide for cationic systems, and modified cationic polyacrylamide and diallyl diethylammonium chloride for anionic systems.

Additionally, the random fiber polymeric composite sheet can comprise a variety of other ingredients. Minor amounts of from about 10-33 percent by weight of the solids, dry weight basis, of fillers such as silica compounds $CaCO_3$, $MgO$, $CaSiO_3$ (wollastonite) and mica can be incorporated. Optionally, pigments and dyes can be employed to impart color or opacity. Preservatives can also be added such as UV stabilizers and antioxidants. Other chemical additives such as foaming agents, antifoaming agents, bacteriocides, electromagnetic radiation absorption agents, etc. can be employed depending on the desired article to be produced.

Low levels of synthetic polymeric fibers, also called polyolefin pastes or pulp, are optional but advantageous in the preparation of the polymeric composite. For example, polyaramid pulp additives are generally disclosed in French Patent Publication No. 2,507,123-A as contributing to the cohesive properties of the composite. Other typical polymeric fibers are polyethylene, polypropylene, polyvinylchloride, polyester, polystyrene and ABS (acrylonitrile-butadiene-styrene copolymer). Generally, the polymeric fibers are present in an amount of from about 1 to about 10, preferably from about 3 to about 5 weight percent based on total solids.

The porous random fiber polymeric sheets prepared as described herein can be advantageously employed as baffles, filters, or other devices where a porous material is desired. An advantage provided by the subject porous material is the excellent properties of the random fiber polymeric composite. In one respect, the subject porous materials, unlike most porous materials, have reinforcement material contained therein as provided by the polymeric composite. Additionally, the various components of the polymeric composite can be adjusted to engineer a variety of porous materials, i.e., rigid, flexible, conductive, or colored, depending on the type of polymer and reinforcement material employed.

If desired, the random fiber polymeric sheet can be used without immediately removing the imbedded cellulose ether therefrom. In such a case, the sheet can be employed in a manner where the solubility of the cellulose ether and subsequent porosity of the sheet would be an indicator of a water source or a time delay means for permitting the flow of water or similar material. Where surface treated cellulose ethers are employed, the polymeric sheets can be used to detect pH changes.

The following examples are for purposes of illustration only and are not to be construed as limiting the scope of the invention. All parts and percentages are by weight unless otherwise specified. Examples of the present invention are identified by Arabic numerals and comparative examples not representative of the present invention are identified by alphabetic characters.

EXAMPLES 1-29 AND COMPARATIVE EXAMPLES A-H

Preparation of Reinforced Polymer Composite Mats

Reinforced polymer composite mats were prepared by forming a dilute aqueous dispersion having a solids content of about 0.5 percent. The dispersion was prepared in the following manner. A first dispersion was prepared by stirring 0.25 grams of xanthan gum, commercially available from the Kelco Division of Merck & Co., Inc. under the trade designation Kelzan TM, into one gallon (3.78 liters) of water. A second dispersion was prepared by stirring 5.3 grams of a 40% solids mat of polyethylene fibers, commercially available from Himont Corp., under the trade designation Pulpex ™ E, into one gallon (3.78 liters) of water. The first and second dispersions were admixed to provide a thickened water slurry. All additions of material to the thickened water slurry were accomplished while continuously and rapidly stirring said slurry. First, 27.0 grams of 3/16 inch (4.8 millimeter) wet, chopped strand glass fibers (415 BB, commercially available from Owens Corning Fiberglas) were added as a reinforcing material. After the glass fibers were well dispersed, 5.0 grams of a 50% solids content latex (54/45/1 parts styrene/butadiene/fumaric acid) available from The Dow Chemical Company under the designation XD 30570.3, were added as a binder. After the binder was well dispersed, an amount (See. Table I) of a six melt index high density polyethylene powder (density of 0.964 grams per cubic centimeter and a 91,000 molecular weight) commercially available from The Dow Chemical Company, was added with continued stirring. After the polyethylene was uniformly dispersed, an amount (See, Table I) of cellulose ether was added with continued stirring to all dispersions except that from which Comparative Example A was prepared. The cellulose ether was one of two hydroxypropyl methylcellulose ethers commercially available from The Dow Chemical Company under the trade designations J20MS and 228. When the cellulose ether was uniformly dispersed, 30 grams (total) of a 0.5 percent aqueous solution of flocculant (Betz® 1260, commercially available from Betz Laboratories) were added, with continued stirring, to destabilize the dispersion.

After flocculation was generally complete, the dispersion or slurry was poured into a sheet mold, air agitated for about ten seconds, dewatered, wet pressed on blotting paper under a ten pound per square inch (psi) (about 69 kilopascal (kpa)) pressure and then oven dried at 100° Centigrade for about three hours to form a dried composite mat.

Three or four layers of the dried composite mats were stacked to provide a total thickness of approximately 0.135 inch (0.343 centimeter). One inch (2.54 centimeter) disks were die cut from the stacked mats and then molded, or densified, into two inch (5.08 centimeter) disks having a thickness of 0.035 inch (0.89 centimeter) using an automatic laboratory scale Pasadena Hydraulics Incorporated press and a 0.035 inch (0.89 centimeter) mold or platen. The press was preheated to a temperature of 195° Centigrade before the disks were inserted for compression molding. After the disks were inserted, they were subjected to the following cycle: (a) preheating for six minutes at a ram force of about 200 kilograms; b) application of medium pressure at a ram force of from about 15,000 to about 17,000 kilograms for 0.5 minutes; (c) application of high pressure at a ram force of about 25,000 kilograms for two minutes; and (d) cooling under high pressure to a temperature of less than 70° Centigrade. Sufficient cooling occurred in a period of four and one-quarter minutes. The densified disks were then removed from the press.

Some of the densified disks were then placed in an open press heated to a temperature of about 190° Centigrade. As a result of heating, the densified disks were expanded in thickness (lofted). The lofted disks were then cooled to a temperature of less than 70° Centigrade.

Extraction of Cellulose Ethers

Densified disks and lofted disks were placed in a beaker under cold running tap water. After one hour, the disks did not feel slippery to the touch, indicating that portions of the cellulose ether at or near the surface of the disks had been removed. After four hours of washing, only the densified disk originally containing 50% cellulose ether appeared to contain some residual cellulose ether. The lofted disks appeared to be quite porous and held water as evidenced by wet spots on paper towels upon which the disks were placed after being washed.

Evaluation of Flow Rate Through Random Fiber Composite Samples

The washed disks were die cut into smaller disks that would fit into a ¾ inch (1.9 centimeter) diameter threaded pipe union which had an upper half and a lower half. The union was fitted with an upper ¾ inch (1.9 centimeter) diameter pipe nipple and a lower ¾ inch (1.9 centimeter) diameter pipe nipple. The smaller disks were disposed between the halves of the pipe union and secured in place by threadably engaging the halves of the union. The lower pipe nipple was inserted through a rubber stopper which was, in turn, fitted into the mouth of a vacuum flask.

A one hundred milliliter portion of water was placed in the upper pipe nipple and a vacuum applied via the vacuum flask. The amount of time required for the water to pass from the upper pipe nipple to the vacuum flask was measured for all samples save for that originally containing fifty percent cellulose ether. Because the flow rate through those samples originally containing fifty percent cellulose ether was much slower than that through the other samples, the number of milliliters of water flowing through the sample in a period of time was used as a measure.

Table I shows the formulations used in preparing the samples. Table II shows the times measured as described in the preceding paragraph. In all of the tables, a "-" means that a value was not measured or that no remarks are pertinent.

TABLE I

| FORMULATION COMPOSITION | | | |
|---|---|---|---|
| Formulation Number | Cellulose Ether Amount (Grams) | Cellulose Ether Designation | HDPE Amount (Grams) |
| F1 | None | — | 41.0 |
| F2 | 4.1 | J20MS | 36.9 |
| F3 | 8.2 | J20MS | 32.8 |
| F4 | 20.5 | J20MS | 20.5 |
| F5 | 8.2 | 228 | 32.8 |

TABLE II

| FLOW RATES/TIMES (FOUR HOUR RATE) | | | | |
|---|---|---|---|---|
| Example/ Comparative Example | Formulation | Time (seconds) for 100 Milliliters Individual Run | Average | Remarks |
| 1 | F2 | 51.43 | — | — |
| 2 | F2 | 41.25 | — | — |
| 3 | F2 | 39.33 | — | — |
| 4 | F2 | 44.27 | — | — |
| 5 | F2 | 44.33 | | |
| | | | 44.12 | — |
| 6 | F3 | 39.8 | — | — |
| 7 | F3 | 33.8 | — | — |

TABLE II-continued

| | FLOW RATES/TIMES (FOUR HOUR RATE) | | | |
|---|---|---|---|---|
| Example/ Comparative Example | Formulation | Time (seconds) for 100 Milliliters | | Remarks |
| | | Individual Run | Average | |
| 8 | F3 | 37.2 | — | — |
| | | | 36.93 | — |
| 9 | F5 | 26.05 | — | — |
| 10 | F5 | 25.14 | — | — |
| 11 | F5 | 28.76 | — | — |
| | | | 26.65 | — |
| A | F4 | — | — | 23 ml in 20 minutes |

The smaller disks were washed under running water for an additional twelve hours and then retested for flow time. Table III shows the times so measured and a flow rate calculated from such times. A blank having no original cellulose ether content is included for purposes of comparison.

TABLE III

| | FLOW RATES/TIMES (EXTENDED RINSE) | | | | |
|---|---|---|---|---|---|
| Example/ Comparative Example | Formulation | Time (seconds) for 100 Milliliters | | Flow Time and Amount | Calculated Flow Rate (ml/sec/mil of thickness) |
| | | Individual Run | Average | | |
| 12 | F2 | 31.34 | — | — | — |
| 13 | F2 | 38.83 | — | — | — |
| 14 | F2 | 38.07 | — | — | — |
| 15 | F2 | 39.31 | — | — | — |
| | | | 36.9 | — | 2.71 |
| 16 | F3 | 28.85 | — | — | — |
| 17 | F3 | 32.65 | — | — | — |
| 18 | F3 | 28.25 | — | — | — |
| 19 | F3 | 27.63 | — | — | — |
| | | | 29.34 | — | 3.41 |
| 20 | F5 | 28.49 | — | — | — |
| 21 | F5 | 27.95 | — | — | — |
| 22 | F5 | 28.6 | — | — | — |
| 23 | F5 | 30.96 | — | — | — |
| | | | 29.0 | — | 3.45 |
| B | F4 | — | — | 35 ml in 10 min | 0.058 |
| C | F1 | — | — | 90 ml in 130 sec | — |
| D | F1 | — | — | 85 ml in 120 sec | — |
| E | F1 | — | — | 85 ml in 120 sec | — |
| | | — | — | | 0.708 |

For purposes of comparison, disks prepared in the same manner save for the lofting step were tested for flow rate. Results are listed in Table IV.

TABLE IV

| CALCULATED FLOW RATES/TIMES (DENSIFIED COMPOSITES -EXTENDED RINSE) | | |
|---|---|---|
| Example/ Comparative Example | Formulation | Calculated Flow Rate (ml/sec/mil of thickness) |
| F | F1 | 0.005 |
| 24 | F2 | 0.030 |
| 25 | F3 | 0.033 |
| 26 | F3 | 0.040 |
| 27 | F3 | 0.048 |
| 28 | F5 | 0.029 |
| 29 | F5 | 0.046 |
| G | F4 | 0.001 |
| H | F4 | 0.028 |

The results shown in Table II through IV demonstrate that flow rates are improved somewhat by lofting and markedly by a combination of a certain amount of cellulose ether and lofting. The results also show that inclusion of too much cellulose ether leads to poor and inconsistent results.

What is claimed is:

1. A process for preparing a porous random fiber polymeric composite sheet comprising the addition of a soluble cellulose ether to a random fiber composite slurry comprising a diluent, a fusible organic polymer, reinforcement material and binder under conditions such that said cellulose ether is insoluble: forming said slurry into a sheet; fusing the organic polymer component of said sheet; and treating said sheet under conditions sufficient to solubilize said cellulose ether whereby voids are formed in said sheet.

2. The process of claim 1 wherein said random fiber composite slurry is an aqueous slurry wherein said conditions such that said cellulose ether is insoluble are that the temperature of said aqueous slurry is maintained above the gelation point of said cellulose ether.

3. The process of claim 2 wherein said soluble cellulose ether is an hydroxyalkyl methylcellulose where said alkyl contains 2, 3 or 4 carbon atoms, a hydroxyalkyl cellulose ether where said alkyl contains 3 or 4 carbon atoms, or methylcellulose.

4. The process of claim 3 wherein said cellulose ether is methylcellulose or hydroxypropyl methylcellulose.

5. The process of claim 1 where said random fiber composite slurry is prepared with a nonaqueous diluent.

6. The process of claim 5 where said diluent is a lower aliphatic alcohol containing from about 1 to about 6 carbon atoms.

7. The process of claim 6 wherein the slurry is maintained under sufficient pressure to keep the alcohol from boiling at a temperature below the cellulose ethers gelation point.

8. The process of claim 5 where said diluent is perchloroethylene.

9. The process of claim 1 where said soluble cellulose ether is a surface treated cellulose ether where said conditions such that said cellulose ether is insoluble are dependent on the pH of said random fiber composite slurry.

10. The process of claim 1 which includes the additional step of lofting said sheet prior to solubilizing said cellulose ether.

11. A porous random fiber polymeric composite sheet as prepared by the process of claim 1.

12. A process for preparing an expanded, porous random fiber polymeric composite sheet comprising (a) preparing a random fiber composite slurry comprising a diluent, a fusible organic polymer, at least one reinforcing material, a binder and a cellulose ether, which is selectively soluble or insoluble, under conditions such that said cellulose ether is insoluble; (b) destabilizing and forming said slurry into a mat or sheet; (c) dewatering and drying said mat; (d) fusing a plurality of mats into a densified sheet; (e) heating said densified sheet under conditions sufficient to soften the fusible polymer and expand said sheet in a direction normal to the plane of the sheet thereby forming a lofted sheet; and (f) treating said lofted sheet under conditions sufficient to solubilize said cellulose ether and form voids in said lofted sheet.

13. The process of claim 12 wherein said cellulose ether is a hydroxyalkyl methylcellulose where said alkyl contains 2, 3 or 4 carbon atoms, a hydroxyalkyl cellulose ether where said alkyl contains 3 or 4 carbon atoms, or methylcellulose.

14. The process of claim 12 wherein said diluent is water, a lower aliphatic alcohol containing from about one to about six carbon atoms or perchloroethylene.

15. The process of claim 12 wherein said cellulose ether is a surface treated cellulose ether which is selectively soluble or insoluble depending upon the pH of the slurry in which it is dispersed.

16. An expanded porous random fiber polymeric composite sheet as prepared by the process of claim 12.

17. A random fiber polymeric composite sheet comprising:
    (a) a binder,
    (b) a fusible organic polymer,
    (c) a reinforcing material, and
    (d) a cellulose ether.

18. The sheet of claim 17 wherein said cellulose ether is removed by treating said sheets under conditions such that said cellulose ether is dissolved.

19. The sheet of claim 17 where said cellulose ether is a hydroxyalkyl methylcellulose where said alkyl contains 2, 3 or 4 carbon atoms, a hydroxyalkyl cellulose ether where said alkyl contains 3 or 4 carbon atoms, or methylcellulose.

20. The sheet of claim 19 where said cellulose ether is hydroxypropyl methylcellulose or methylcellulose.

21. The process of claim 4 wherein the cellulose ether has a degree of substitution between about 1.1 and about 2.0 and a molar substitution of between about 0.001 and about 1.0.

* * * * *

UNITED STATES PATENT AND TRADEMARK OFFICE
CERTIFICATE OF CORRECTION

PATENT NO. : 4,775,580

DATED : October 4, 1988

INVENTOR(S) : Gaylon L. Dighton

It is certified that error appears in the above-identified patent and that said Letters Patent is hereby corrected as shown below:

Cover sheet, under ABSTRACT, line 7 please delete "heating" and insert -- treating --.

Column 3, line 29 please delete "groups, O i.e.," and insert -- groups, i.e., --.

Column 5, line 53 please delete -- A --.

Column 5, line 57 please delete "about O" and insert -- about --.

Signed and Sealed this

Eighteenth Day of July, 1989

Attest:

DONALD J. QUIGG

Attesting Officer

Commissioner of Patents and Trademarks